Patented Feb. 23, 1954

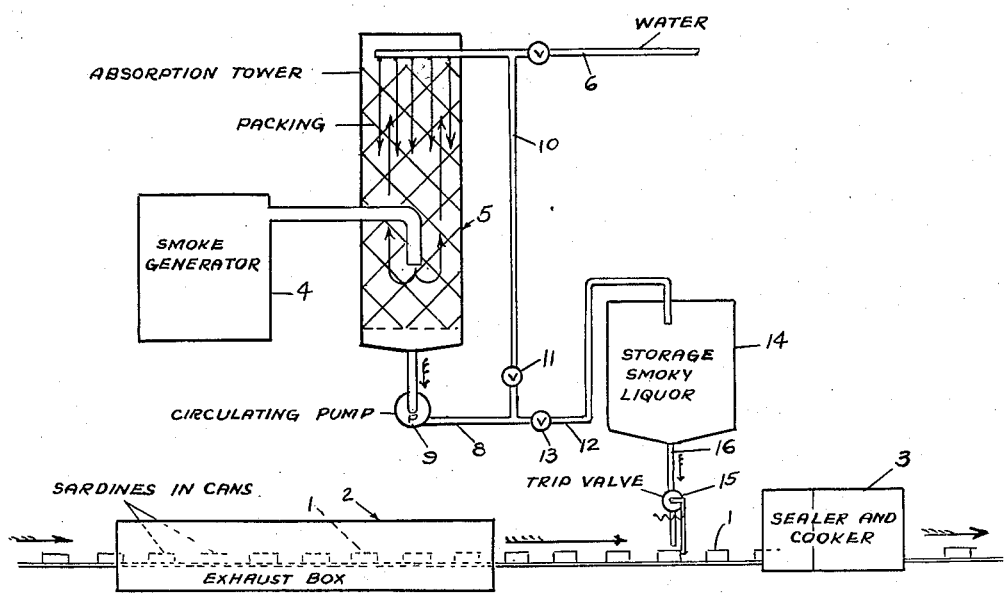

2,670,295

UNITED STATES PATENT OFFICE 2,670,295

PROCESS FOR SMOKING AND CANNING FISH

Charles S. Ash, San Francisco, Calif.

Application March 28, 1949, Serial No. 83,902

6 Claims. (Cl. 99—188)

This invention relates to the smoking of food products in general, and more specifically to a process for smoking canned fish, it being understood however, that the invention is not necessarily restricted to fish. It may be applied to other products that are brittle or easily injured in handling.

The conventional method of smoking fish, such, for example, as sardines, sardine fillets and other fish to be subsequently canned, is to place the pieces of fish on screens or perforated supporting trays, and the loaded trays are then placed in a suitable chamber into which smoke of the proper character is introduced. The fish, thus exposed to the smoke, gradually takes on the usual and desired smoky flavor and character. The fish to be smoked may be either in a cooked or in a raw state.

While this orthodox process is suitable for smoking foods that are capable of withstanding handling, it is not an economic one for smoking relatively delicate fish or fish fillets. The more delicate fish will break up in handling, particularly after smoking and upon removal from the trays and then placing them into cans. Where attempted, the loss has usually been so high that it has made the finally canned commercial product prohibitive in price. Besides, the process is quite slow, and the cost of the handling of the fish several times is high.

A fairly recent proposal is to first pack the fish into cans and to then conduct the open topped cans through a chamber containing the smoke. This smoke is deposited instantly on the surface of the fish by electrostatic means. The objections are that the time of exposure is so short that the smoke flavor imparted is very feeble, and the cost of the necessary equipment is quite high and the process is complicated.

The principal object of this invention is the provision of an economical process for giving to the food product the desired degree of smoky flavor by simple economical and easily operated process and equipment.

Another object of the invention is the provision of an improved product for use in imparting a smoky flavor to food products.

A still further object of the invention is the provision of an economical process for imparting a smoky flavor to food products after the same are packed in cans or containers, and which flavor is uniformly distributed throughout the food product at the time of heating the same for sterilization purposes.

Other objects and advantages will appear in the description.

The drawing is a schematic view of one form of apparatus for carrying out the process.

In detail, the food product, such, for example, as sardine fillets, are packed in cans 1, and these filled cans are then passed through a conventional exhaust box 2. There are no covers on the cans while in the exhaust box, and the latter is usually in the form of a box or tunnel that is heated with live steam to temperatures approaching the boiling point of water, say from about 140° F. to 212° F. During the exhausting step the fish are heated to the above temperature, and air and gases are removed therefrom. Subjecting the fish to a temperature of about 200° F. is normally adequate for exhausting the air and gas therefrom.

When the containers or cans 1, with the fish therein, leave the exhaust box, the smoky liquid, later to be described, is added to the cans and fish. After such addition the cans are closed and go to the usual cooker or sterilizer 3 where the temperature usually reaches about 240° F. to about 250° F., and the said smoke is again volatilized, and uniformly permeates the fish or contents of the can. On cooling, the smoke is reabsorbed by the fish or contents of the can.

This smoky liquid is preferably produced by generating smoke from the proper hardwood or other suitable material in the smoke generator 4. This smoke is conducted into an absorption tower 5 wherein the water, brine, or other liquid capable of absorbing the smoke falls through conventional packing therein, while the smoke ascends through the tower and packing in a direction contra to the movement of the falling water. Any other method of absorption may be employed.

The water or other liquid may be conducted into the upper end of tower 5 through pipe 6.

The smoky liquid is withdrawn from the bottom of the tower through a pipe 8 having a circulating pump 9 therein, and pipe 8 may connect with pipe 6 by a pipe 10 having a valve 11 therein so that the smoky liquid may be recirculated through the tower by opening the valve 11.

A continuation 12 of pipe 8 has a valve 13 therein that must be closed to cause re-circulation of the liquid through the tower, when valve 11 is opened.

This continuation 12 passes into a storage tank 14 where the smoky liquor is stored for use and from which it may be withdrawn by a conventional trip valve 15 in a discharge pipe 16. This type of trip valve is common, and is automatically opened by movement of a can therepast for discharge of a predetermined amount of smoky liquor into each can. The valve automatically closes after each tripping thereof.

The smoky liquor may be further refined by fractional distillation, etc., to improve or to enhance its character before being injected into the cans. In such cases the extension 12 may lead to the desired still or to a storage tank that would in turn be connected with a still, or other suitable apparatus and then the re-fined product would be used for injection into the cans.

The invention as claimed is intended to cover the use of the smoky liquid in either the refined or unrefined state, inasmuch as it may ordinarily be used either way.

As has already been mentioned, the process is not necessarily restricted to fish; although it is particularly suitable for use in smoking and canning delicate, easily injured fish that will not withstand the necessary handling by present methods. The amount of liquid that is injected into each can is determined by the size of the can, the character of the product and the concentration of the liquid. For say, an 8 ounce can of sardine fillets, from $\frac{2}{16}$ to $\frac{8}{16}$ oz., or more may be used. This amount may vary according to the concentration, but in any event the amount to be used is easily determined, and the correct amount is one that which will give the fish or whatever product is smoked, the desired smoky flavor. In the claims, where the word "fish" is used, such as in defining the step of hermetically sealing said fish in unbroken condition within a can, the word "fish" is intended to refer to whole fish or to whole fish fillets since in some instances the fish may be packed whole without filleting and in other instances the fish are fileted and the whole fillets are packed.

It is to be understood that the smoky liquid herein described is not to be confused with pyroligneous acid, also called "liquid smoke."

Pyroligneous acid is the product of destructive distillation containing tars, etc.

The reagent we describe is the same smoke used in orthodox method of smoking food products; absorbed in water, brine, etc.

I claim:

1. The process of smoking and canning whole delicate fish and fish fillets substantially without breakage thereof that comprises the steps of: hermetically sealing said fish in unbroken condition within a can together with a liquid smoke carrier in which smoke has been absorbed and then re-volatilizing the smoke that is in said carrier by subjecting the canned fish and carrier while so sealed to sufficient heat to cause said smoke to re-volatilize, whereby the volatilized smoke within the can will permeate the sealed fish and will smoke the same.

2. The process of smoking and canning delicate fish and fish fillets that comprises the steps of: packing said fish raw in unbroken condition within a container, then injecting into said container a liquid smoke carrier containing smoke absorbed therein, then hermetically sealing said container with the whole unbroken fish and said carrier therein, then revolatilizing the smoke in said carrier by application of heat to said container and to the fish and carrier therein whereby the volatile smoke will permeate said fish to smoke the same.

3. The process of smoking and canning delicate fish and fish fillets that will not withstand breakage from repeated handling before canning that consists of the steps of: packing said fish and fish fillets into cans in a raw unbroken condition, then subjecting said fish to a temperature of about 200° F. for exhausting the air and gas therefrom, thereafter injecting into said cans a liquid smoke carrier in which smoke has been absorbed, then hermetically sealing said cans with said carrier and unbroken fish therein, and heating said cans and the contents thereof from about 240° F. to about 250° F. whereby smoke will permeate said unbroken fish.

4. The process of smoking and packaging whole, delicate fish and fish fillets substantially without breakage thereof that includes the step of revolatizing smoke within a hermetically sealed package in which said delicate fish and a predetermined amount of a liquid smoke carrier have been packed, and which carrier carries the smoke that is to be so revolatized.

5. The process of smoking and packaging delicate fish and fish fillets, that includes the steps of revolatilizing smoke within a hermetically sealed package in which said delicate fish and a predetermined amount of a liquid smoke carrier have been packed and which carrier carries the smoke to be so revolatilized, the said revolatizing step being caused by heating the contents of said package to a point where the smoke that has been absorbed by said carrier will volatilize.

6. The process of smoking and packaging delicate fish and fish fillets that will not withstand breakage from repeated handling before packaging that includes the steps of: revolatilizing smoke within a hermetically sealed substantially air gas free package in which said delicate fish, fish fillets have been packed in a raw condition together with a liquid smoke carrier containing the smoke to be so revolatilized the revolatilizing step being caused by heating said fish and carrier to a temperature of about 200° F. and then heating the contents of said package from about 240° F. to about 250° F. to effect further permeation of said fish by the revolatilized smoke.

CHARLES S. ASH.

References Cited in the file of this patent

UNITED STATES PATENTS

| Number | Name | Date |
| --- | --- | --- |
| 127,115 | Stanley | May 21, 1872 |
| 157,446 | Gyles | Dec. 8, 1874 |
| 511,288 | Chase | Dec. 19, 1893 |
| 1,677,364 | Peebles | July 17, 1928 |
| 1,880,837 | Cudahy | Oct. 4, 1932 |
| 1,960,516 | Taylor | May 29, 1934 |
| 2,333,505 | Allen | Nov. 2, 1943 |
| 2,338,156 | Allen | Jan. 4, 1944 |
| 2,411,736 | Kleinschmidt | Nov. 26, 1946 |